US012619127B2

(12) United States Patent
Wu et al.

(10) Patent No.: US 12,619,127 B2
(45) Date of Patent: May 5, 2026

(54) OPTICAL ELEMENT DRIVING MECHANISM

(71) Applicant: Actutek Corporation, Taoyuan City (TW)

(72) Inventors: Chia-Che Wu, Taoyuan City (TW); Chao-Chang Hu, Taoyuan City (TW); Yu-Chiao Lo, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 260 days.

(21) Appl. No.: 18/495,852

(22) Filed: Oct. 27, 2023

(65) Prior Publication Data

US 2024/0142858 A1 May 2, 2024

Related U.S. Application Data

(60) Provisional application No. 63/420,236, filed on Oct. 28, 2022.

(51) Int. Cl.
| | |
|---|---|
| *G03B 13/36* | (2021.01) |
| *G02B 3/14* | (2006.01) |
| *G02B 7/08* | (2021.01) |
| *G02B 27/64* | (2006.01) |
| *G03B 5/00* | (2021.01) |

(52) U.S. Cl.
CPC ................ *G03B 5/00* (2013.01); *G02B 3/14* (2013.01); *G02B 7/08* (2013.01); *G02B 27/646* (2013.01); *G03B 13/36* (2013.01); *G03B 2205/0069* (2013.01)

(58) Field of Classification Search
CPC . G02B 7/021; G02B 7/08; G02B 7/09; G02B 7/10; G02B 9/62; G02B 13/001; G02B 13/0065; G02B 27/646; H04N 5/2253; H04N 5/2254; H04N 5/2257; H04N 5/23287; H04N 23/68; H04N 23/682; H04N 23/685; H04N 23/687; G03B 2205/00; G03B 2205/0007; G03B 2205/0053; G03B 2205/0069; G03B 3/02; G03B 3/10; G03B 5/00; G03B 5/04; G03B 13/36; G03B 30/00; G03B 2205/0038; H02K 11/21; H02K 11/33; H02K 41/0354; H02K 41/0356
USPC ....... 359/911, 554, 555, 557, 811, 813, 814, 359/824, 872, 877; 396/52, 55
See application file for complete search history.

(56) References Cited

U.S. PATENT DOCUMENTS

| | | | | |
|---|---|---|---|---|
| 2021/0377447 A1* | 12/2021 | Jeong | ....................... | G03B 3/10 |
| 2021/0397017 A1* | 12/2021 | Jeong | ................... | G02B 7/1805 |

* cited by examiner

*Primary Examiner* — Marin Pichler
(74) *Attorney, Agent, or Firm* — MUNCY, GEISSLER, OLDS & LOWE, P.C.

(57) ABSTRACT

An optical element driving mechanism is used for accommodating a first optical element and includes a fixed assembly, a movable part and a driving assembly. The movable part is configured to connect a second optical element. The second optical element corresponds to the first optical element. The movable part is movable relative to the fixed assembly. The driving assembly is configured to drive the movable part to move relative to the fixed assembly. The fixed assembly includes a first accommodation space configured to accommodate the first optical element.

19 Claims, 10 Drawing Sheets

OPTICAL ELEMENT DRIVING MECHANISM

CROSS REFERENCE TO RELATED APPLICATIONS

This application claims the benefit of U.S. Provisional Application No. 63/420,236, filed Oct. 28, 2022, the entirety of which is incorporated by reference herein.

BACKGROUND OF THE INVENTION

Field of the Disclosure

The present disclosure relates to an optical element driving mechanism, and in particular it relates to an optical element driving mechanism with a long focal length and anti-shake function.

Description of the Related Art

As technology has developed, many of today's electronic devices (such as smartphones) have a camera and video-recording functionality. Using the camera modules disposed in electronic devices, users can operate their electronic devices to capture photographs and record videos.

Today's design of electronic devices continues to follow the trend of miniaturization, meaning that the various components of the camera module and its structure must also be continuously reduced in size, so as to achieve miniaturization. In general, the driving mechanism in a camera module has a camera lens holder configured to hold a camera lens, and the driving mechanism can perform the functions of auto focusing and optical image stabilization. However, although existing driving mechanisms can achieve the aforementioned functions of photography and video recording, they still cannot meet all of the users' needs.

Therefore, how to design a camera module capable of performing autofocus, optical anti-shake functions and achieving miniaturization at the same time are topics nowadays that need to be discussed and solved.

BRIEF SUMMARY OF THE INVENTION

Accordingly, one objective of the present disclosure is to provide an optical element driving mechanism to solve the above problems.

According to some embodiments of the disclosure, an optical element driving mechanism is provided for accommodating a first optical element and including a fixed assembly, a movable part and a driving assembly. The movable part is configured to connect a second optical element, the second optical element corresponds to the first optical element, and the movable part is movable relative to the fixed assembly. The driving assembly is configured to drive the movable part to move relative to the fixed assembly. The fixed assembly includes a first accommodation space configured to accommodate the first optical element.

According to some embodiments, the movable part includes a second accommodation space configured to accommodate the first optical element. The second accommodation space is located in the first accommodation space. The second optical element defines an optical axis. The optical axis passes through the second optical element and the first optical element. When viewed along the optical axis, the movable part has a long strip-shaped structure.

According to some embodiments, the movable part further includes a first side wall, a second side wall and a first opening. When viewed along the optical axis, the first side wall is located on one side of the first optical element. When viewed along the optical axis, the second side wall is located on other side of the first optical element. When viewed along the optical axis, the first optical element is located between the first side wall and the second side wall. The first opening corresponds to the first optical element.

According to some embodiments, the first side wall has a first surface and a second surface, and the second side wall has a third surface and a fourth surface. The first surface is facing the first optical element. The second surface and the first surface are facing opposite directions. The third surface is facing the first optical element. The fourth surface and the third surface are facing opposite directions.

According to some embodiments, the first side wall and the second side wall respectively have a first groove and a second groove. The first groove is recessed from the second surface. The second groove is recessed from the fourth surface. The driving assembly includes a first driving element and a second driving element, which are respectively disposed in the first groove and the second groove. The first driving element and the second driving element are configured to drive the movable part to rotate around a first rotation axis, so that a pushing portion of the second optical element pushes a main body of the second optical element to change the optical properties of second optical element. North-pole and South-pole of the first driving element are arranged along the optical axis. North-pole and South-pole of the second driving element are arranged along the optical axis.

According to some embodiments, when viewed along a first axis, at least a portion of the first optical element is exposed from the first opening. The first axis is not parallel to the optical axis. The movable part further includes a top wall and a second opening. The top wall is connected between the first side wall and the second side wall. The movable part further includes a first oblique wall which is connected between the top wall and the first side wall. The movable part further includes a second oblique wall which is connected between the top wall and the second side wall. The first oblique wall and the second oblique wall are not parallel to the optical axis and the first axis. The top wall corresponds to the second optical element.

According to some embodiments, when viewed along the first axis, the movable part has a U-shaped structure. When viewed along the first axis, the movable part surrounds a portion of the first optical element. The second opening corresponds to the second optical element and is located on the top wall. The second opening is formed on the top wall. The optical axis passes through the second opening. The first side wall further has a third groove. The second side wall further has a fourth groove. The third groove is recessed from the second surface. The fourth groove is recessed from the fourth surface.

According to some embodiments, the driving assembly includes a third driving element and a fourth driving element, which are respectively disposed in the third groove and the fourth groove. The third driving element and the fourth driving element are configured to drive the movable part to rotate around a second rotation axis, so that the pushing portion pushes the main body to change the optical properties of the second optical element. North-pole and South-pole of the third driving element are arranged along the first axis. North-pole and South-pole of the fourth driving element are arranged along the first axis. The first driving element and the third driving element are arranged along the optical axis. The second driving element and the fourth driving element are arranged along the optical axis.

According to some embodiments, the fixed assembly further includes a base and an outer frame. The outer frame is fixedly connected to the base and forms the first accommodation space. The fixed assembly further includes a third opening and a fourth opening. The third opening corresponds to the second optical element. The third opening corresponds to the first optical element. The fourth opening corresponds to the first optical element. The outer frame has a first outer wall and a second outer wall. The first outer wall and the second outer wall each have a plate-shaped structure.

According to some embodiments, the third opening is formed on the first outer wall. The fourth opening is formed on the second outer wall. The first outer wall and the second outer wall are parallel to each other. When viewed along the optical axis, the third opening is larger than the second opening. The base includes a base plate which has a plate-shaped structure. The fixed assembly further includes a first supporting portion disposed on the base plate to accommodate the first optical element. The first optical element is fixedly connected to the first supporting portion of the fixed assembly.

According to some embodiments, the base further includes a first setting portion and a second setting portion extending from the base plate along the first axis. When viewed along the optical axis, the first supporting portion is located between the first setting portion and the second setting portion. When viewed along the first axis, the first side wall is located between the first setting portion and the first supporting portion. When viewed along the first axis, the second side wall is located between the second setting portion and the first supporting portion. There is a gap between the first surface and the first supporting portion. There is another gap between the second surface and the first setting portion. There is another gap between the third surface and the first supporting portion. There is another gap between the fourth surface and the second setting portion.

According to some embodiments, the optical element driving mechanism further includes a circuit assembly which is fixedly disposed on the base of the fixed assembly. The circuit assembly includes a first circuit portion and a second circuit portion. The circuit assembly further includes a third circuit portion which is connected between the first circuit portion and the second circuit portion. The third circuit portion is fixedly connected to the bottom of the base. The driving assembly further includes a first coil and a second coil, corresponding to the first driving element and the second driving element respectively. The first coil and the second coil are fixedly disposed on the first circuit portion and the second circuit portion respectively.

According to some embodiments, the first setting portion and the second setting portion respectively form a first accommodating opening and a second accommodating opening. The first coil and the second coil are respectively located in the first accommodating opening and the second accommodating opening. When the first coil and the second coil respectively act with the first driving element and the second driving element to generate a first electromagnetic driving force and a second electromagnetic driving force, the first driving element and the second driving element are configured to drive the movable part to rotate around the first rotation axis. The first rotation axis is parallel to the first axis. The first electromagnetic driving force and the second electromagnetic driving force are exerted in opposite directions.

According to some embodiments, the driving assembly further includes a third coil and a fourth coil, corresponding to the third driving element and the fourth driving element respectively. The third coil and the fourth coil are respectively and fixedly disposed on the first circuit portion and the second circuit portion. The third coil and the fourth coil are respectively located in the first accommodating opening and the second accommodating opening. The third driving element and the fourth driving element are configured to drive the movable part to rotate around the second rotation axis when the third coil and the fourth coil respectively act with the third driving element and the fourth driving element to generate a third electromagnetic driving force and a fourth electromagnetic driving force. The third electromagnetic driving force and the fourth electromagnetic driving force are exerted in the same direction.

According to some embodiments, the optical element driving mechanism further includes a connecting assembly, so that the movable part is movably connected to the fixed assembly through the connecting assembly. The connecting assembly includes a first elastic member and a second elastic member. The first elastic member and the second elastic member respectively have a first flexible portion and a second flexible portion. The first flexible portion has flexibility. The second flexible portion has flexibility. When viewed along the optical axis, the first flexible portion and the first optical element are arranged along a second axis. The second axis is not parallel to the first axis. The second rotation axis is parallel to the second axis.

According to some embodiments, when viewed along the optical axis, a longitudinal axis of the movable part having a long strip-shaped structure is parallel to the second axis. When viewed along the optical axis, the first flexible portion and the second flexible portion are arranged along the second axis. When viewed along the optical axis, the center of the second optical element is located between the first flexible portion and the second flexible portion. When viewed along the optical axis, the first rotation axis is located between the first flexible portion and the second flexible portion. When viewed along the optical axis, the second rotation axis passes through the first flexible portion and the second flexible portion.

According to some embodiments, the first elastic member has a first connecting end which is fixedly connected to the fixed assembly. The first connecting end is affixed to a first setting portion. The first elastic member further has a second connecting end which is fixedly connected to the movable part. The first flexible portion is connected between the first connecting end and the second connecting end. The second elastic member has a third connecting end which is fixedly connected to the fixed assembly. The third connecting end is affixed to a second setting portion. The second elastic member further has a fourth connecting end which is fixedly connected to the movable part. The second flexible portion is connected between the third connecting end and the fourth connecting end. When viewed along the optical axis, the first setting portion, the second optical element and the second setting portion are arranged along the second axis. When viewed along the optical axis, the optical element driving mechanism does not include any flexible portion arranged with the second optical element along the first axis.

According to some embodiments, the first optical element and the second optical element are made of different materials. The first optical element and the second optical element are in different material states. The second optical element is a liquid lens. The first optical element includes a solid lens. The second optical element includes an optical fixed portion. The optical fixed portion is fixedly connected to the fixed assembly. The optical fixed portion is affixed to the fixed assembly by laser welding. The optical axis passes through the main body. The pushing portion is fixedly connected to the movable part. The pushing portion has a ring-shaped structure. When viewed along the optical axis, the optical fixed portion overlaps at least a portion of the connecting assembly.

According to some embodiments, the optical element driving mechanism further includes a circuit assembly which is fixedly disposed on the base of the fixed assembly. The circuit assembly includes a first circuit portion and a second circuit portion, respectively affixed to the first setting portion and the second setting portion. The driving assembly further includes a first coil and a second coil, corresponding to the first driving element and the second driving element respectively. The first coil and the second coil are fixedly disposed on the first circuit portion and the second circuit portion respectively.

According to some embodiments, the first setting portion and the second setting portion respectively form a first accommodating opening and a second accommodating opening. The first coil and the second coil are respectively located in the first accommodating opening and the second accommodating opening. When the first coil and the second coil respectively act with the first driving element and the second driving element to generate a first electromagnetic driving force and a second electromagnetic driving force, the first driving element and the second driving element are configured to drive the movable part to move along the optical axis. The first electromagnetic driving force and the second electromagnetic driving force are exerted in the same direction.

The present disclosure provides an optical element driving mechanism, which can be a periscope lens mechanism, including a fixed assembly, a driving assembly, a movable part and a connecting assembly. The movable part is movably connected to the base of the fixed assembly through the connecting assembly, and the movable part surrounds the first optical element. The optical fixed portion of the second optical element is affixed to the outer frame of the fixed assembly, and the pushing portion is fixedly connected to the movable part.

The driving assembly is configured to drive the movable part to move relative to the base and the first optical element to drive the pushing portion to push the thin film and the liquid, thereby changing the optical properties of the second optical element, so as to achieve the purpose of optical image stabilization and macro photography. Because there is a gap between the movable part and the base, the movable part does not collide with the base and cause damage when rotating.

It is worth noting that the first driving element and the third driving element MG3 of the driving assembly are disposed on the same side of the movable part, and the second driving element and the fourth driving element are disposed on the other same side of the movable part. Correspondingly, the first coil and the third coil are disposed on the same side of the circuit assembly, and the second coil and the fourth coil are disposed on the other same side of the circuit assembly.

Because the arrangement direction of the North-pole and South-pole of the first driving element is perpendicular to the arrangement direction of the North-pole and South-pole of the third driving element (the second driving element and the fourth driving element have the same configuration), and the longitudinal axis of the first coil is perpendicular to the longitudinal axis of the third coil (the second coil and the fourth coil have the same configuration). Therefore, such a configuration not only avoids the problem of magnetic interference, but also achieves the purpose of miniaturization at the same time.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
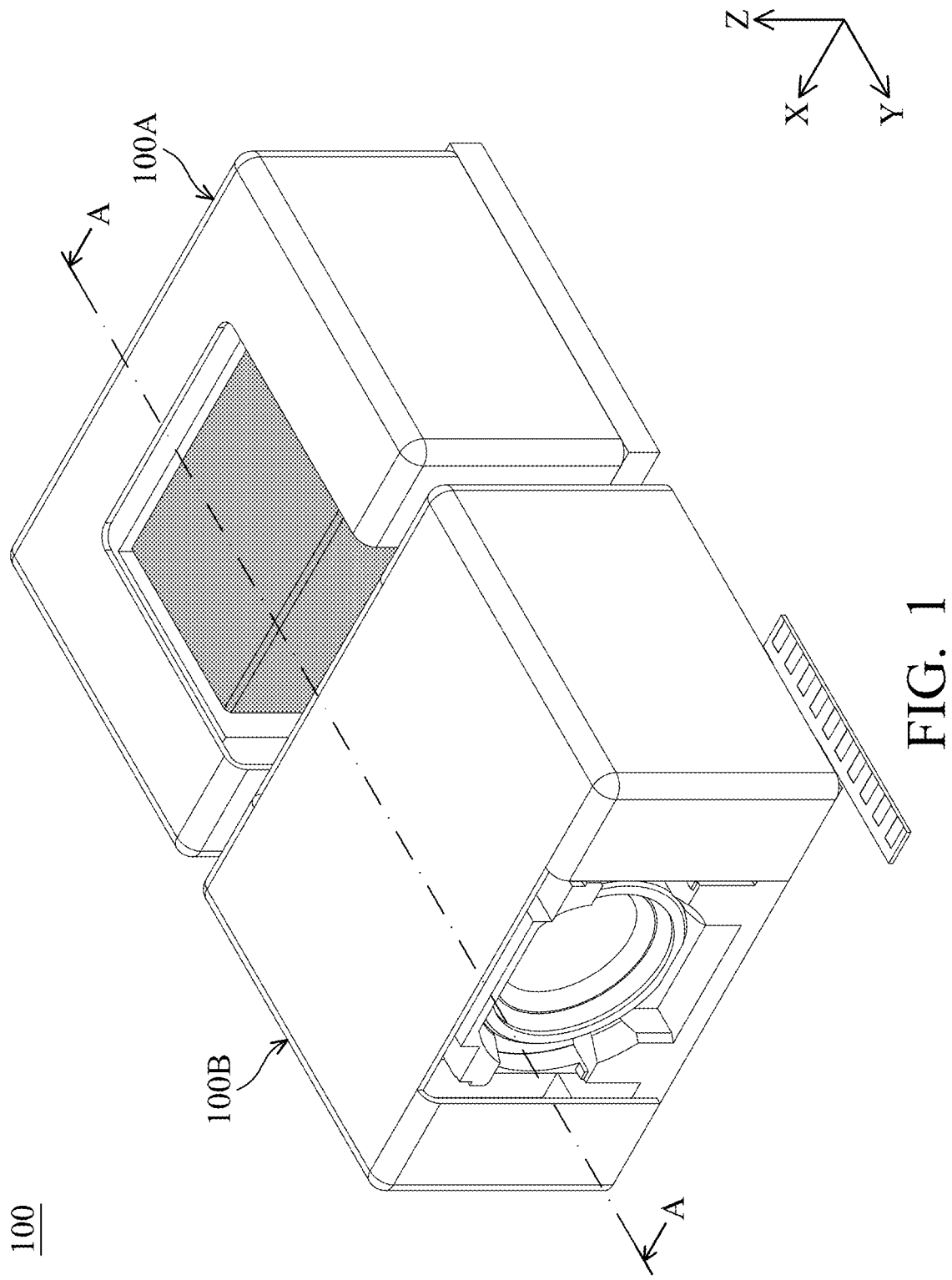
FIG. 1 is a schematic diagram of an optical element driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
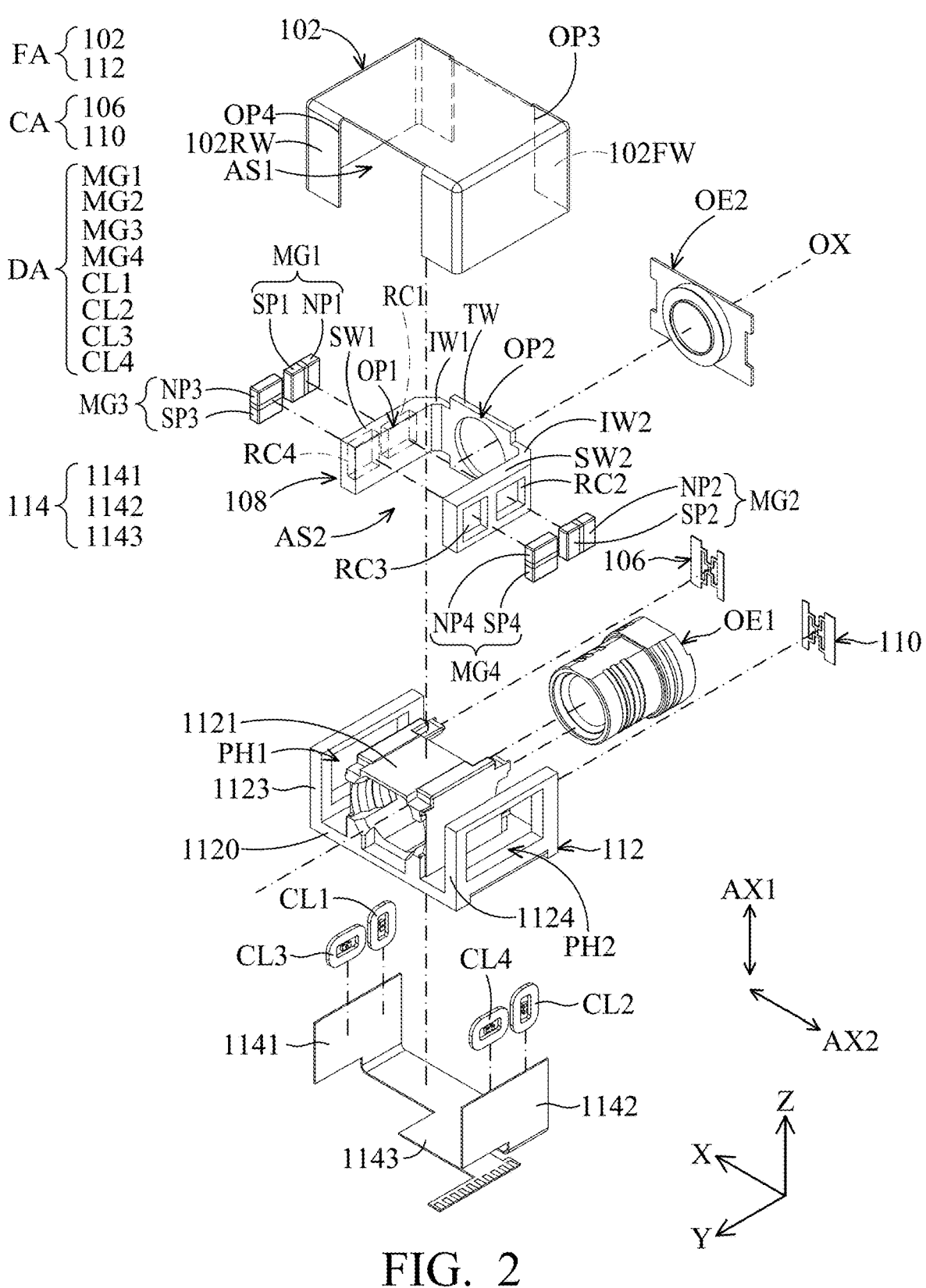
FIG. 2 is an exploded diagram of a partial structure of the optical element driving mechanism 100 according to an embodiment of the present disclosure.
Figure 3:
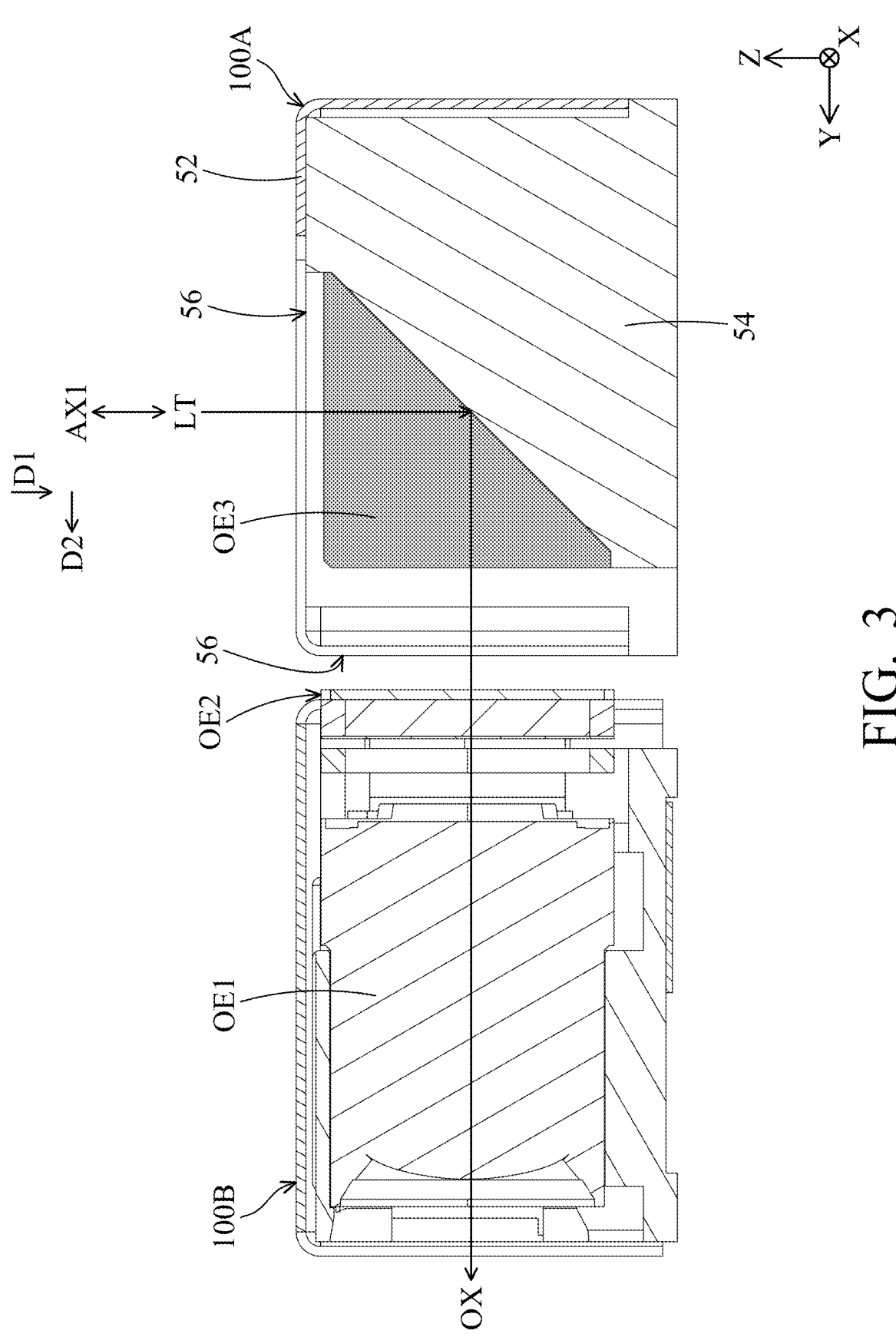
FIG. 3 is a cross-sectional view of the optical element driving mechanism 100 along line A-A in FIG. 1 according to an embodiment of the present disclosure.

Please refer to FIG. 1 to FIG. 3. FIG. 1 is a schematic diagram of an optical element driving mechanism 100 according to an embodiment of the present disclosure, FIG. 2 is an exploded diagram of a partial structure of the optical element driving mechanism 100 according to an embodiment of the present disclosure, and FIG. 3 is a cross-sectional view of the optical element driving mechanism 100 along line A-A in FIG. 1 according to an embodiment of the present disclosure. The optical element driving mechanism 100 can be an optical camera system and can be configured to hold and drive an optical element. The optical element driving mechanism 100 can be installed in various electronic devices or portable electronic devices, such as a smartphone, for allowing a user to perform the image capturing function. In this embodiment, the optical element driving mechanism 100 can be a voice coil motor (VCM) with an auto-focusing (AF) function, but it is not limited thereto. In other embodiments, the optical element driving mechanism 100 can also perform the functions of auto-focusing and optical image stabilization (OIS).

In this embodiment, as shown in FIG. 3, the optical element driving mechanism 100 may include a first optical module 100A and a second optical module 100B. An external light LT enters the first optical module 100A along a first axis AX1 and is reflected by a third optical element OE3, then passes through a second optical element OE2 and is emitted from a first optical element OE1 of the second optical module 100B.

The first optical module 100A may include a housing 52, a base 54 and the aforementioned third optical element OE3. The housing 52 is fixedly connected to the base 54, and the third optical element OE3 is fixedly disposed on the base 54. The housing 52 forms an opening 56. The external light LT is incident on the opening 56 in a first direction D1, is reflected by the third optical element OE3, and then is emitted from the opening 56 in a second direction D2.

The first direction D1 and the second direction D2 are not parallel to each other, for example, they are perpendicular to each other, and the first direction D1 is parallel to the first axis AX1. In this embodiment, the third optical element OE3 is a fixed reflective prism lens, but it is not limited thereto. In other embodiments, the first optical module 100A may also include a driving mechanism to drive the third optical element OE3 to rotate (for example, around the X-axis) to achieve an optical compensation effect.

In this embodiment, the second optical module 100B may have autofocus (AF) and/or optical image stabilization (OIS) functions, and the second optical module 100B may be a fixed lens, or may also have autofocus (AF) and/or optical image stabilization (OIS) functions. In other words, the functions of the first optical module 100A and the second optical module 100B can be selected and matched with each other according to actual needs.

As shown in FIG. 2, the second optical module 100B may include a fixed assembly FA, a movable part 108, and a driving assembly DA. The movable part 108 is configured to be connected to the second optical element OE2. The second optical element OE2 corresponds to the first optical element OE1, and the movable part 108 is movable relative to the fixed assembly FA and the first optical element OE1. The driving assembly DA is configured to drive the movable part 108 to move relative to the fixed assembly FA.

In this embodiment, as shown in FIG. 2, the fixed assembly FA includes an outer frame 102 and a base 112. The outer frame 102 is fixedly connected to the base 112 and forms a first accommodation space AS1 which is configured to accommodate the first optical element OE1. Specifically, the first optical element OE1 may be a camera lens which has one or several lens, and the first optical element OE1 is affixed to the base 112.

Figure 4:
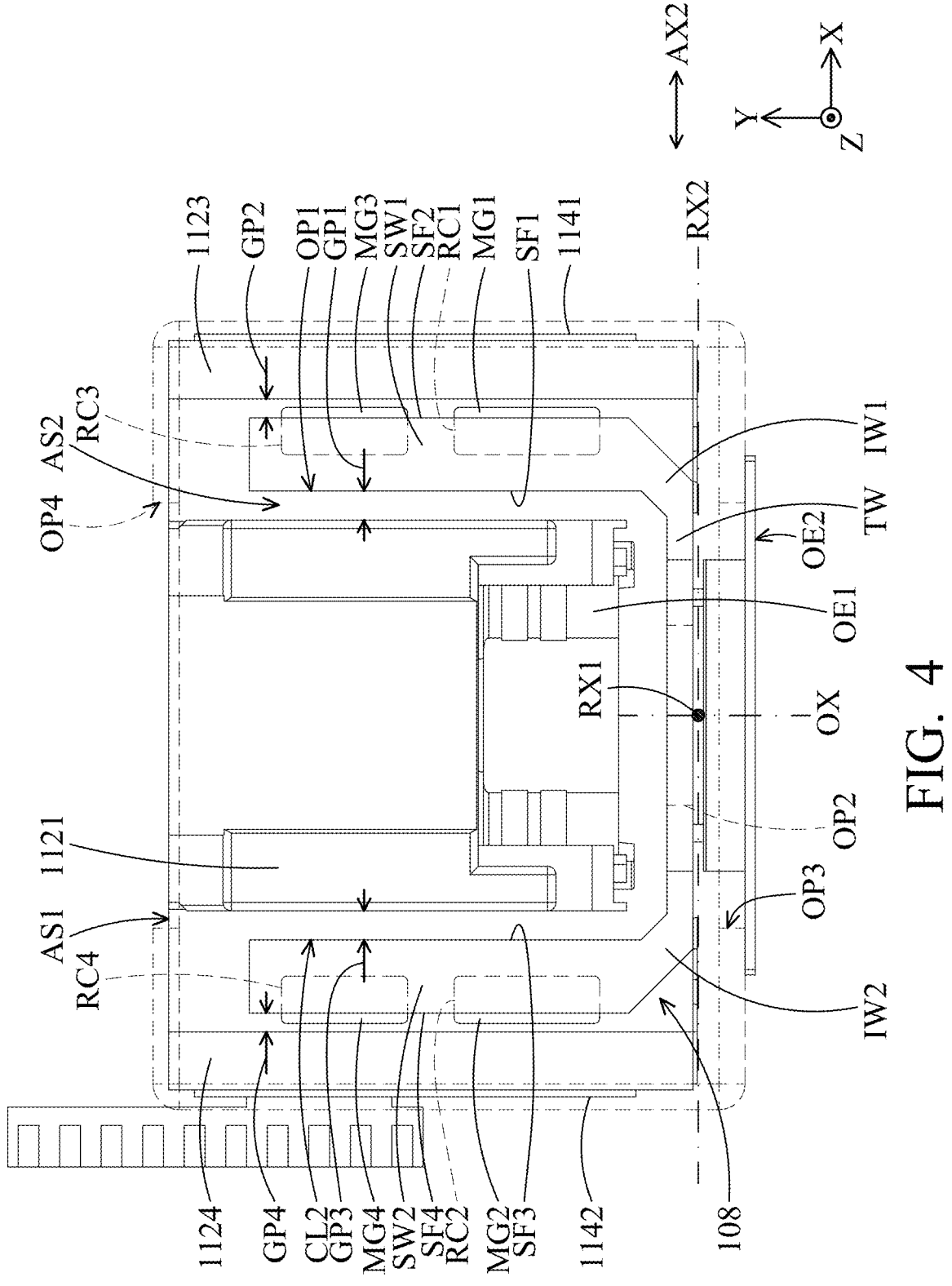
FIG. 4 is a top view of the second optical module 100B according to an embodiment of the present disclosure.
Figure 5:
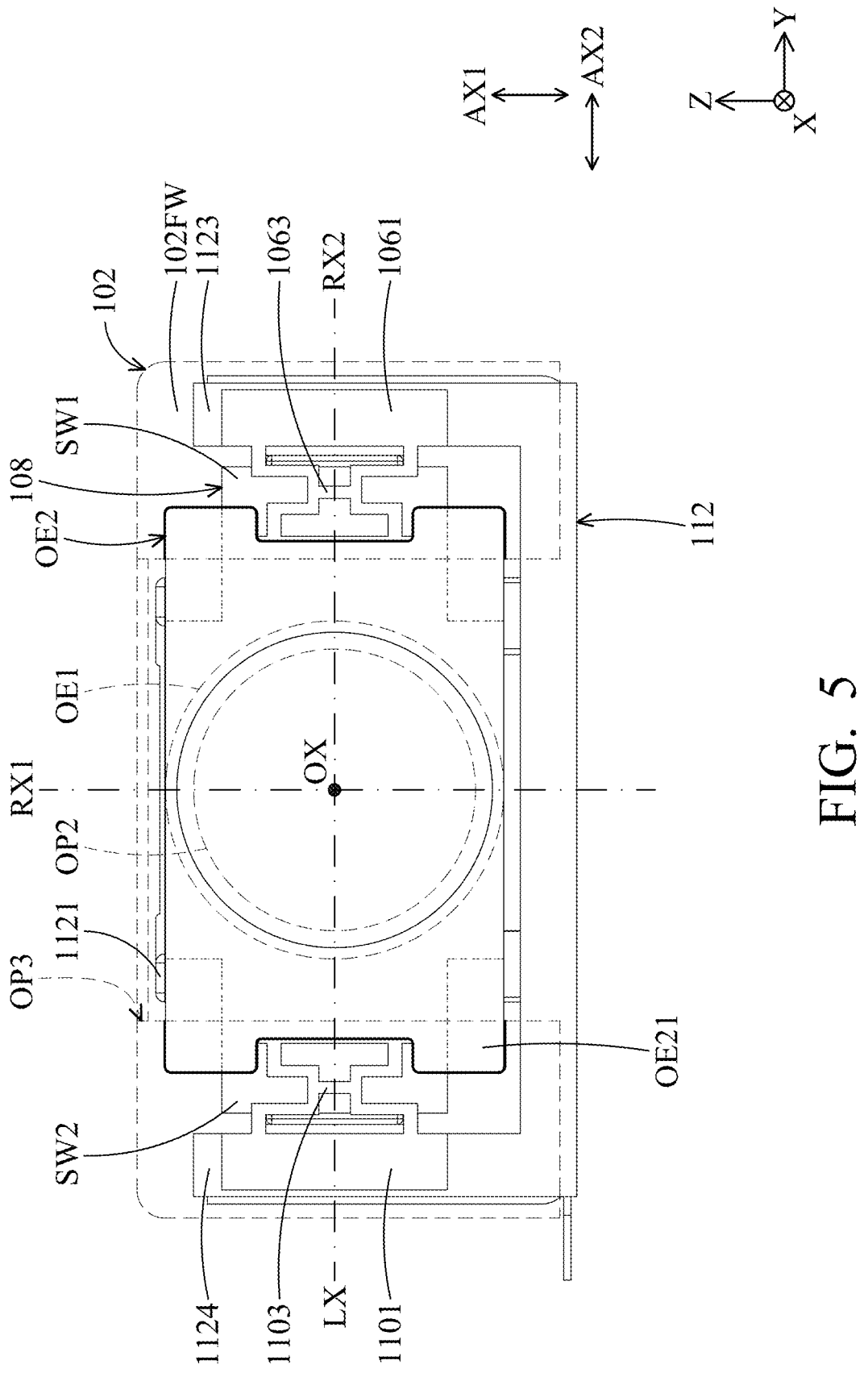
FIG. 5 is a font view of the second optical module 100B according to an embodiment of the present disclosure.

Next, please refer to FIG. 1 to FIG. 5. FIG. 4 is a top view of the second optical module 100B according to an embodiment of the present disclosure, and FIG. 5 is a font view of the second optical module 100B according to an embodiment of the present disclosure. It should be noted that, in order to clearly represent the internal structure, the outer frame 102 in the figures is drawn with a dotted line, which does not mean that the outer frame 102 does not exist. The following figures are the same.

As shown in FIG. 2 and FIG. 4, the movable part 108 may include a second accommodation space AS2 configured to accommodate the first optical element OE1, and the second accommodation space AS2 is located in the first accommodation space AS1.

In this embodiment, the second optical element OE2 may define an optical axis OX, and the optical axis OX passes through the second optical element OE2 and the first optical element OE1. As shown in FIG. 2 and FIG. 5, when viewed along the optical axis OX, the movable part 108 has a long strip-shaped structure.

Furthermore, in this embodiment, the movable part 108 may include a first side wall SW1, a second side wall SW2 and a first opening OP1. As shown in FIG. 5, when viewed along the optical axis OX, the first side wall SW1 is located on one side of the first optical element OE1. When viewed along the optical axis OX, the second side wall SW2 is located on the other side of the first optical element OE1. When viewed along the optical axis OX, the first optical element OE1 is located between the first side wall SW1 and the second side wall SW2.

In addition, the first opening OP1 corresponds to the first optical element OE1, and when viewed along the first axis AX1 (FIG. 4), at least a portion of the first optical element OE1 is exposed from the first opening OP1. The first axis AX1 is not parallel to the optical axis OX, for example, perpendicular to the optical axis OX.

As shown in FIG. 4, the first side wall SW1 has a first surface SF1 and a second surface SF2, and the second side wall SW2 has a third surface SF3 and a fourth surface SF4. The first surface SF1 is facing the first optical element OE1, and the second surface SF2 of the first side wall SW1 and the first surface SF1 are facing opposite directions. Furthermore, the third surface SF3 is facing the first optical element OE1, and the fourth surface SF4 and the third surface SF3 are facing opposite directions.

As shown in FIG. 2 and FIG. 4, the first side wall SW1 and the second side wall SW2 have a first groove RC1 and a second groove RC2 respectively, and the first groove RC1 is recessed from the second surface SF2, and the second groove RC2 is recessed from the fourth surface SF4.

The driving assembly DA may include a first driving element MG1 and a second driving element MG2, which are respectively disposed in the first groove RC1 and the second groove RC2. As shown in FIG. 2, the North-pole NP1 and South-pole SP1 of the first driving element MG1 are arranged along the optical axis OX, and the North-pole NP2 and South-pole SP2 of the second driving element MG2 are arranged along the optical axis OX.

As shown in FIG. 2 and FIG. 4, the movable part 108 further includes a top wall TW and a second opening OP2, and the top wall TW is connected between the first side wall SW1 and the second side wall SW2. The second opening OP2 corresponds to the second optical element OE2 and is located on the top wall TW. Specifically, the second opening OP2 is formed on the top wall TW, and the optical axis OX passes through the second opening OP2.

Furthermore, the movable part 108 further includes a first oblique wall IW1 which is connected between the top wall TW and the first side wall SW1. Similarly, the movable part 108 further includes a second oblique wall IW2 which is connected between the top wall TW and the second side wall SW2.

The extension directions of the first oblique wall IW1 and the second oblique wall IW2 are not parallel to the optical axis OX and the first axis AX1, and the top wall TW corresponds to the second optical element OE2. Specifically, the top wall TW is in contact with the second optical element OE2.

As shown in FIG. 4, when viewed along the first axis AX1 (the Z-axis), the movable part 108 may have a U-shaped structure. When viewed along the first axis AX1, the movable part 108 surrounds a portion of the first optical element OE1.

In this embodiment, the first side wall SW1 further has a third groove RC3, and the second side wall SW2 further has a fourth groove RC4. Specifically, the third groove RC3 is recessed from the second surface SF2, and the fourth groove RC4 is recessed from the fourth surface SF4.

The driving assembly DA further includes a third driving element MG3 and a fourth driving element MG4, which are respectively disposed in the third groove RC3 and the fourth groove RC4. As shown in FIG. 2, the North-pole NP3 and South-pole SP3 of the third driving element MG3 are arranged along the first axis AX1, and the North-pole NP4 and South-pole SP4 of the fourth driving element MG4 are arranged along the first axis AX1.

The first driving element MG1 to the fourth driving element MG4 are magnets, but they are not limited thereto. Furthermore, as shown in FIG. 2, the first driving element MG1 and the third driving element MG3 are arranged along the optical axis OX, and the second driving element MG2 and the fourth driving element MG4 are arranged along the optical axis OX.

In this embodiment, as shown in FIG. 2, FIG. 4 and FIG. 5, the outer frame 102 of the fixed assembly FA may include a third opening OP3 and a fourth opening OP4. The third opening OP3 corresponds to the second optical element OE2, the third opening OP3 also corresponds to the first optical element OE1, and the fourth opening OP4 corresponds to the first optical element OE1.

As shown in FIG. 2 and FIG. 5, the outer frame 102 has a first outer wall 102FW and a second outer wall 102RW, and the first outer wall 102FW and the second outer wall 102RW each have a plate-shaped structure.

Specifically, the aforementioned third opening OP3 is formed on the first outer wall 102FW, and the fourth opening OP4 is formed on the second outer wall 102RW. The first outer wall 102FW and the second outer wall 102RW are parallel to each other. As shown in FIG. 5, when viewed along the optical axis OX, the third opening OP3 is larger than the second opening OP2.

In addition, the base 112 includes a base plate 1120 which has a plate-shaped structure, and the base 112 of the fixed assembly FA further includes a first supporting portion 1121 which is disposed on the base plate 1120 and used to accommodate the first optical element OE1. Specifically, the first optical element OE1 is fixedly connected to the first supporting portion 1121 of the fixed assembly FA. For example, a through hole of the first supporting portion 1121 has a thread which match the thread of the first optical element OE1.

Furthermore, the base 112 may further include a first setting portion 1123 and a second setting portion 1124 extending along the first axis AX1 from the base plate 1120. Specifically, the first setting portion 1123 and the second setting portion 1124 are side walls of the base 112. As shown in FIG. 2 and FIG. 5, when viewed along the optical axis OX, the first supporting portion 1121 is located between the first setting portion 1123 and the second setting portion 1124.

As shown in FIG. 4, when viewed along the first axis AX1, the first side wall SW1 is located between the first setting portion 1123 and the first supporting portion 1121. Similarly, when viewed along the first axis AX1, the second side wall SW2 is located between the second setting portion 1124 and the first supporting portion 1121.

As shown in FIG. 4, there is a gap GP1 between the first surface SF1 and the first supporting portion 1121 of the base 112, and there is a gap GP2 between the second surface SF2 and the first setting portion 1123 of the base 112.

Similarly, there is a gap GP3 between the third surface SF3 and the first supporting portion 1121 of the base 112, there is a gap GP4 between the fourth surface SF4 and the second setting portion 1124 of the base 112, and the third surface SF3 faces the first surface SF1. Based on this design, when the movable part 108 moves relative to the base 112, the movable part 108 does not collide with the base 112.

As shown in FIG. 2, the second optical module 100B of the optical element driving mechanism 100 further includes a circuit assembly 114 which is fixedly disposed on the base 112 of the fixed assembly FA. The circuit assembly 114 is, for example, a flexible circuit board (FPC board), which may include a first circuit portion 1141 and a second circuit portion 1142, respectively affixed to the first setting portion 1123 and the second setting portion 1124.

Correspondingly, the driving assembly DA further includes a first coil CL1 and a second coil CL2, respectively corresponding to the first driving element MG1 and the second driving element MG2. The first coil CL1 and the second coil CL2 are fixedly disposed on the first circuit portion 1141 and the second circuit portion 1142 respectively.

As shown in FIG. 2, the first setting portion 1123 and the second setting portion 1124 respectively form a first accommodating opening PH1 and a second accommodating opening PH2, and the first coil CL1 and the second coil CL2 are respectively located in the first accommodating opening PH1 and the second accommodating opening PH2.

Similarly, the driving assembly DA further includes a third coil CL3 and a fourth coil CL4, respectively corresponding to the third driving element MG3 and the fourth driving element MG4. The third coil CL3 and the fourth coil CL4 are respectively and fixedly disposed on the first circuit portion 1141 and the second circuit portion 1142, and the third coil CL3 and the fourth coil CL4 are also respectively located in the first accommodating opening PH1 and the second accommodating opening PH2.

Furthermore, the circuit assembly 114 further includes a third circuit portion 1143 which is connected between the first circuit portion 1141 and the second circuit portion 1142, and the third circuit portion 1143 is fixedly disposed on the bottom of the base 112 and is electrically connected to an external control circuit. The external control circuit is, for example, a control chip of a smartphone, but it is not limited thereto.

Figure 6:
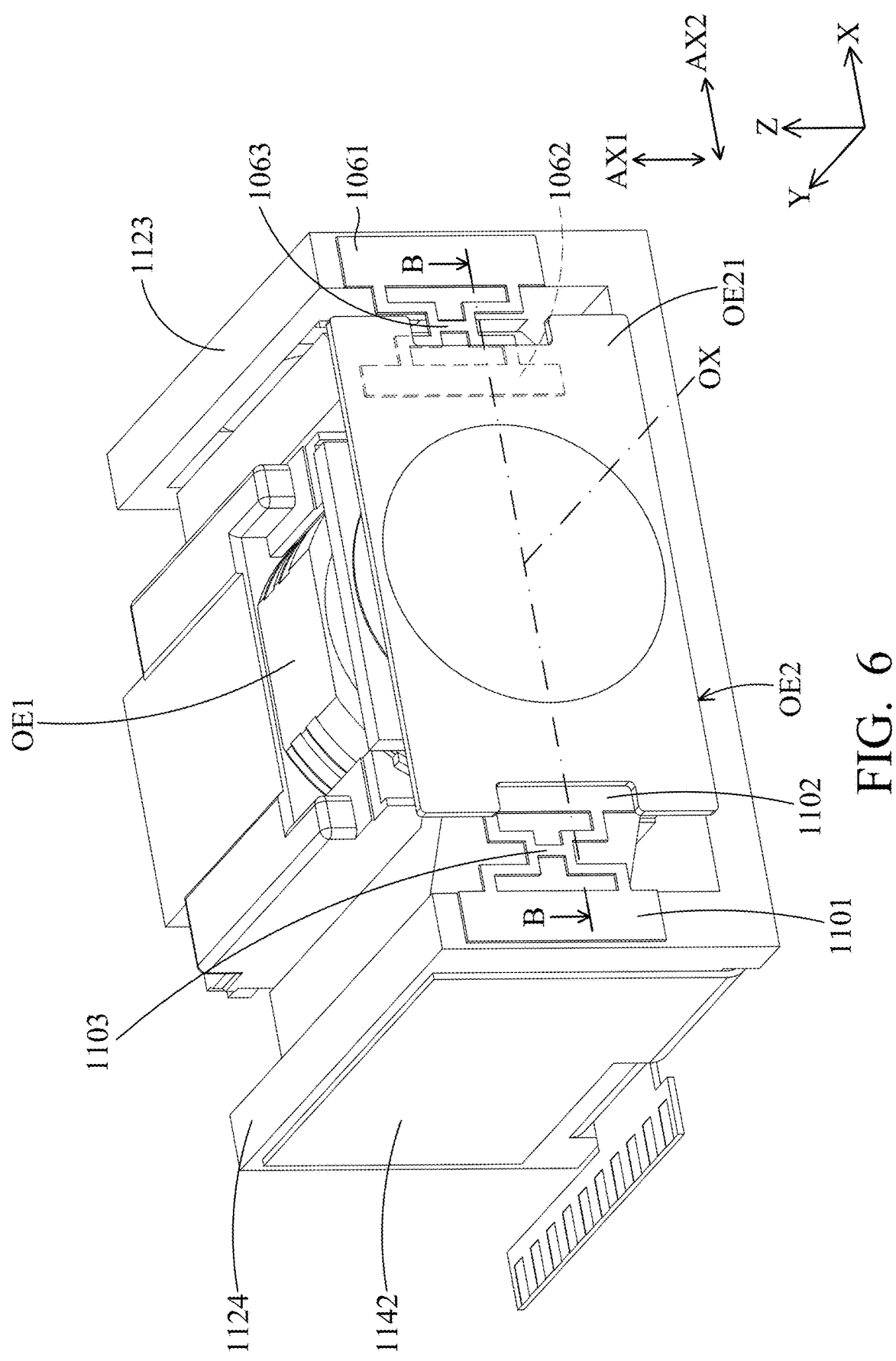
FIG. 6 is a schematic diagram of a partial structure of the second optical module 100B according to an embodiment of the present disclosure.

Next, please refer to FIG. 2, FIG. 5 and FIG. 6. FIG. 6 is a schematic diagram of a partial structure of the second optical module 100B according to an embodiment of the present disclosure. In this embodiment, the second optical module 100B of the optical element driving mechanism 100 further includes a connecting assembly CA, so that the movable part 108 is movably connected to the fixed assembly FA through the connecting assembly CA.

The connecting assembly CA may include a first elastic member 106 and a second elastic member 110. Specifically, as shown in FIG. 6, the first elastic member 106 and the second elastic member 110 respectively have a first flexible portion 1063 and a second flexible portion 1103, the first flexible portion 1063 has flexibility, and the second flexible portion 1103 has flexibility.

As shown in FIG. 5 in FIG. 6, when viewed along the optical axis OX, the first flexible portion 1063 and the first optical element OE1 are arranged along a second axis AX2, and the second axis AX2 is not parallel to the first axis AX1 (that is, perpendicular to each other).

As shown in FIG. 5, when viewed along the optical axis OX, a longitudinal axis LX of the movable part 108 having a long strip-shaped structure is parallel to the second axis AX2. When viewed along the optical axis OX, the first flexible portion 1063 and the second flexible portion 1103 are arranged along the second axis AX2. When viewed along the optical axis OX, the center of the second optical element OE2 is located between the first flexible portion 1063 and the second flexible portion 1103.

Furthermore, as shown in FIG. 5 and FIG. 6, the first elastic member 106 further has a first connecting end 1061 which is fixedly connected to the base 112 of the fixed assembly FA. Specifically, the first connecting end 1061 is affixed to a first setting portion 1123 of the base 112.

Furthermore, the first elastic member 106 further has a second connecting end 1062 which is fixedly connected to the top wall TW of the movable part 108, and the first flexible portion 1063 is connected between the first connecting end 1061 and the second connecting end 1062.

Similarly, the second elastic member 110 may have a third connecting end 1101 which is fixedly connected to the base 112 of the fixed assembly FA. Specifically, the third connecting end 1101 is affixed to the second setting portion 1124 of the base 112.

The second elastic member 110 further has a fourth connecting end 1102 which is fixedly connected to the top wall TW of the movable part 108, and the second flexible portion 1103 is connected between the third connecting end 1101 and the fourth connecting end 1102.

As shown in FIG. 6, when viewed along the optical axis OX, the first setting portion 1123, the second optical element OE2 and the second setting portion 1124 are arranged along the second axis AX2.

It is worth noting that, as shown in FIG. 5, when viewed along the optical axis OX, the second optical module 100B of the optical element driving mechanism 100 does not include any flexible portion which is arranged with the second optical element OE2 along the first axis AX1 (for example, a flexible portion similar to the first flexible portion 1063). Therefore, such a configuration can significantly reduce the height of the optical element driving mechanism 100 along the Z-axis so as to achieve the purpose of thinning.

Figure 7:
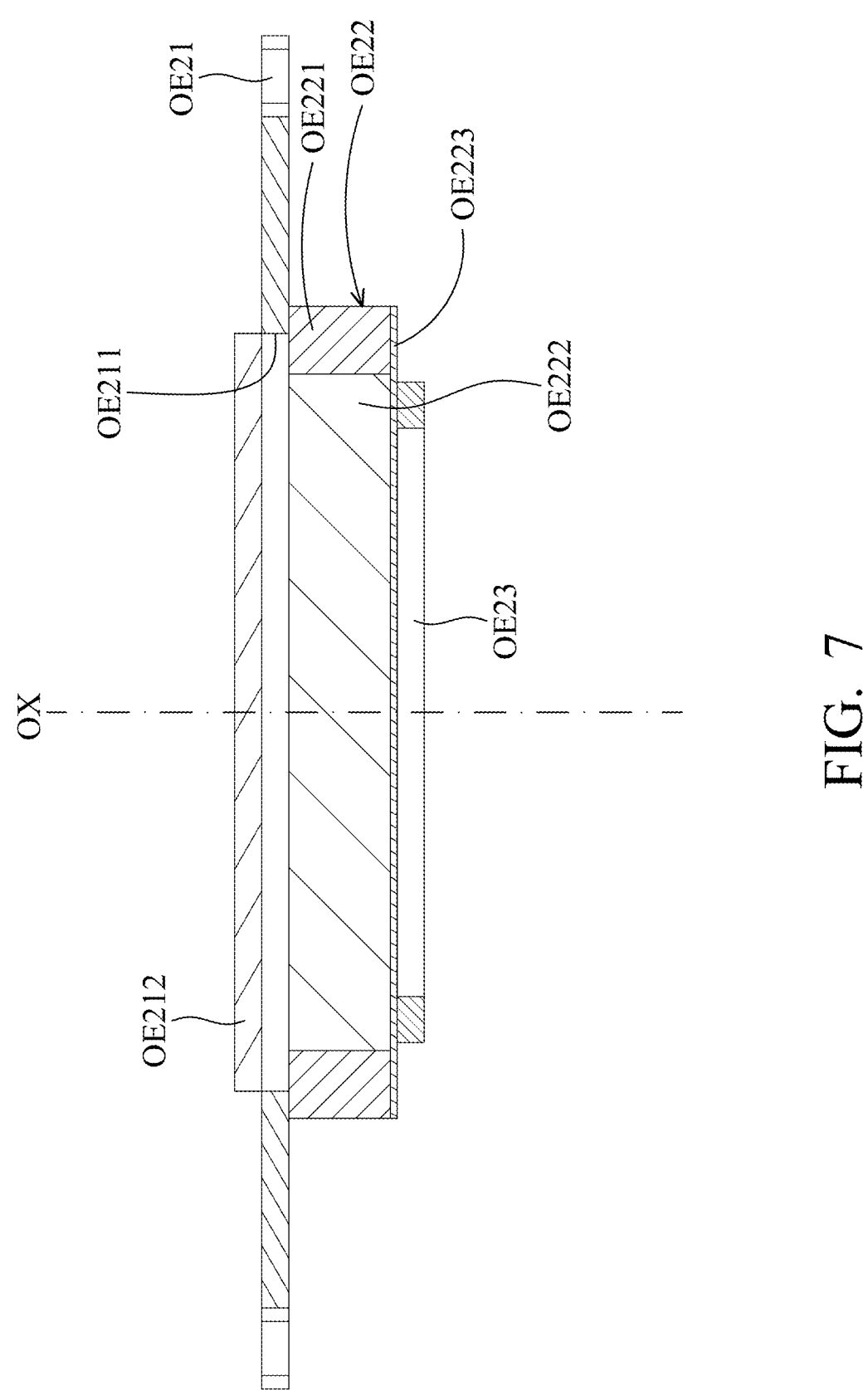
FIG. 7 is a cross-sectional view of the second optical element OE2 along line B-B in FIG. 6 according to an embodiment of the present disclosure.

Next, please refer to FIG. 6 and FIG. 7. FIG. 7 is a cross-sectional view of the second optical element OE2 along line B-B in FIG. 6 according to an embodiment of the present disclosure. In this embodiment, the second optical element OE2 may include an optical fixed portion OE21, a main body OE22 and a pushing portion OE23.

In this embodiment, the first optical element OE1 and the second optical element OE2 may have different materials. For example, the first optical element OE1 and the second optical element OE2 may be in different material states. Specifically, the second optical element OE2 can be a liquid lens, and the first optical element OE1 can be a fixed solid lens, but they are not limited thereto.

As shown in FIG. 7, the optical fixed portion OE21 has a plate-shaped structure which is fixedly connected to the outer frame 102 of the fixed assembly FA. For example, the optical fixed portion OE21 and the outer frame 102 are both made of metal material, so that the optical fixed portion OE21 can be affixed to the outer frame 102 of the fixed assembly FA by laser welding (shown by the bold lines in FIG. 5). It is important to note that the optical fixed portion OE21 is not elastic or flexible.

In addition, as shown in FIG. 5 and FIG. 6, when viewed along the optical axis OX, the optical fixed portion OE21 overlaps at least portion of the connecting assembly CA, such as overlapping the first elastic member 106 and the second elastic member 110.

Furthermore, the optical fixed portion OE21 has an optical opening OE211, so that the aforementioned external light LT can pass through the main body OE22 along the optical axis OX. The optical fixed portion OE21 may further have a translucent element OE212, such as a lens, which is fixedly disposed on the optical fixed portion OE21.

The main body OE22 may have an accommodation frame OE221 to accommodate the liquid OE222 therein, and a thin film OE223 is disposed on the bottom of the accommodation frame OE221 to seal the liquid OE222 within the accommodation frame OE221.

Furthermore, the pushing portion OE23 has a ring-shaped structure which is fixedly connected to the movable part 108 and the thin film OE223 and located between the movable part 108 and the thin film OE223. The pushing portion OE23 can be driven by the movable part 108 to push the thin film OE223 and the liquid OE222, so as to change the optical properties of the second optical element OE2.

Figure 8:
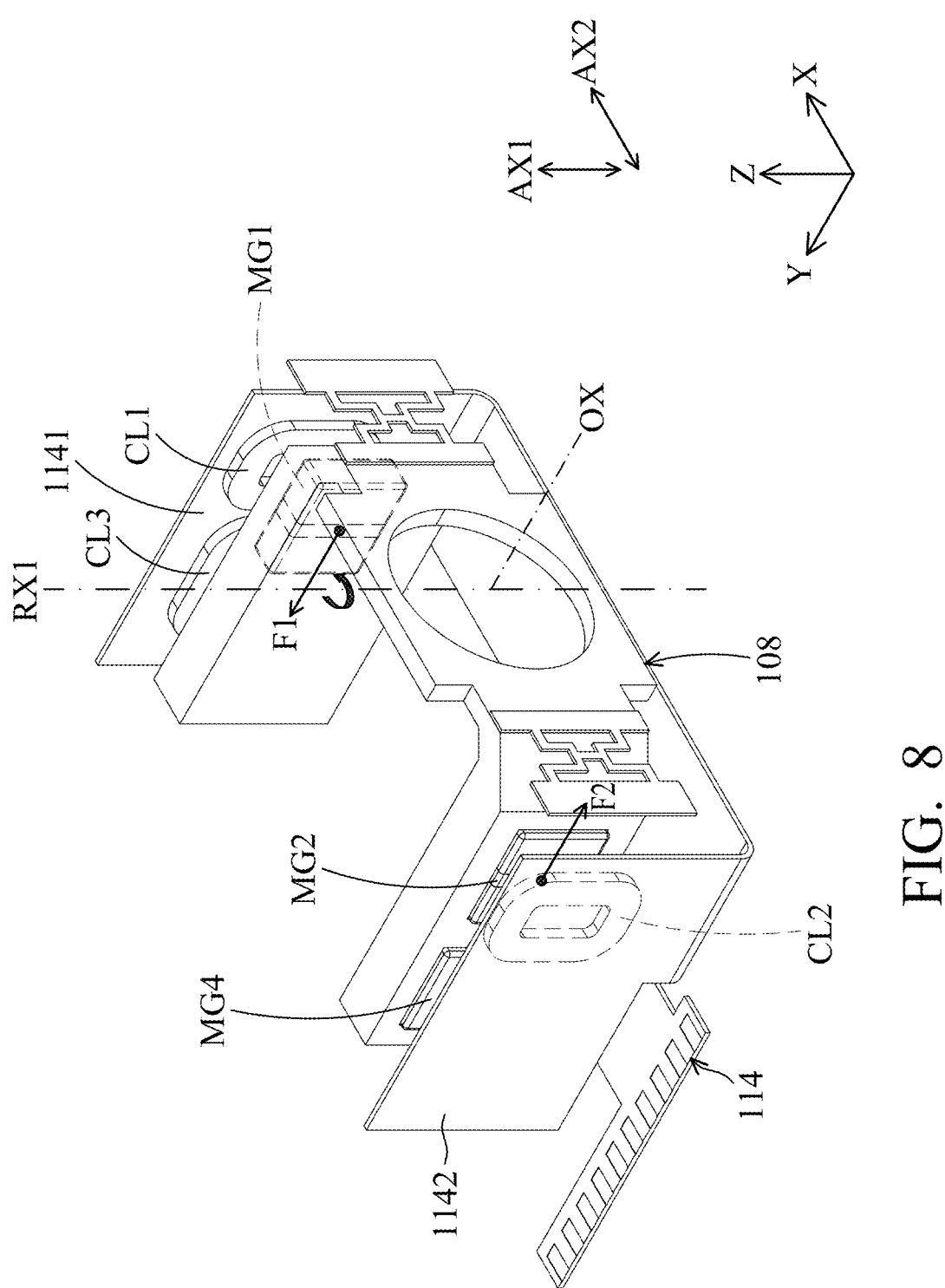
FIG. 8 is a perspective view of the movable part 108, the driving assembly DA and the circuit assembly 114 according to an embodiment of the present disclosure.

Next, please refer to FIG. 4 and FIG. 8. FIG. 8 is a perspective view of the movable part 108, the driving assembly DA and the circuit assembly 114 according to an embodiment of the present disclosure. When the first driving element MG1 and the second driving element MG2 respectively act with the first coil CL1 and the second coil CL2 to respectively generate a first electromagnetic driving force F1 and a second electromagnetic driving force F2, the first driving element MG1 and the second driving element MG2 are configured to drive the movable part 108 to rotate around a first rotation axis RX1, so that the pushing portion OE23 pushes the main body OE22 to change the optical properties of the second optical element OE2, thereby achieving the optical image stabilization function.

The first electromagnetic driving force F1 and the second electromagnetic driving force F2 have opposite directions. Therefore, when viewed along the first axis AX1, the movable part 108 rotates counterclockwise around the first rotation axis RX1, but it is not limited thereto. For example, the directions of the first electromagnetic driving force F1 and the second electromagnetic driving force F2 may be opposite to the arrow directions shown in FIG. 8. Therefore, when viewed along the first axis AX1, the movable part 108 at this time can rotate clockwise around the first rotation axis RX1.

In addition, it is worth noting that, as shown in FIG. 5, when viewed along the optical axis OX, the first rotation axis RX1 is located between the first flexible portion 1063 and the second flexible portion 1103, the first rotation axis RX1 is parallel to the first axis AX1, and the first rotation axis RX1 can intersect with the optical axis OX.

Figure 9:
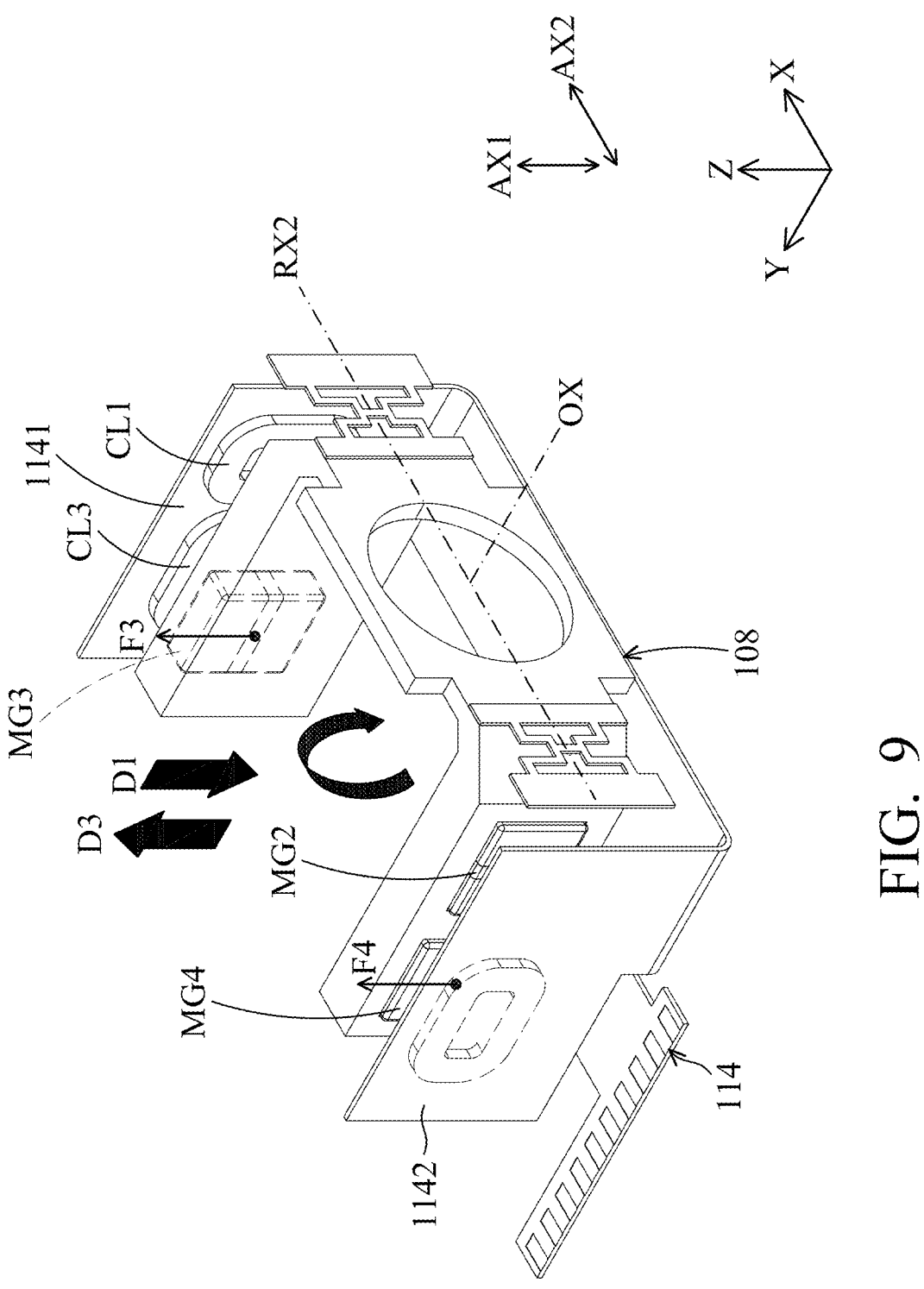
FIG. 9 is a perspective view of the movable part 108, the driving assembly DA and the circuit assembly 114 according to an embodiment of the present disclosure.

Next, please refer to FIG. 4 and FIG. 9. FIG. 9 is a perspective view of the movable part 108, the driving assembly DA and the circuit assembly 114 according to an embodiment of the present disclosure. As shown in FIG. 9, the third coil CL3 and the fourth coil CL4 can respectively act with the third driving element MG3 and the fourth driving element MG4 to generate a third electromagnetic driving force F3 and a fourth electromagnetic driving force F4. The third electromagnetic driving force F3 and the fourth electromagnetic driving force F4 have the same direction and are parallel to a third direction D3. The third direction D3 is opposite to the first direction D1, and the third direction D3 and the first direction D1 are on the Z-axis.

Therefore, the third driving element MG3 and the fourth driving element MG4 drive the movable part 108 to rotate around a second rotation axis RX2 due to the above electromagnetic driving forces, so that the pushing portion OE23 pushes the main body OE22 to change the optical properties of the second optical element OE2 so as to achieve the optical image stabilization function.

The movable part 108 in FIG. 9 rotates around the second rotation axis RX2 to perform a motion similar to Nose-down, but it is not limited to this. When the directions of the third electromagnetic driving force F3 and the fourth electromagnetic driving force F4 are the same and parallel to the first direction D1, the movable part 108 rotates around the second rotation axis RX2 to perform a motion similar to Nose-up. Therefore, the properties of the second optical element OE2 can be changed according to actual needs to achieve the effect of optical compensation. The second rotation axis RX2 may be parallel to the second axis AX2, and when viewed along the optical axis OX, the second rotation axis RX2 passes through the first flexible portion 1063 and the second flexible portion 1103 (FIG. 5).

In addition, it should be noted that in this embodiment, the elastic coefficients of the first elastic member 106 corresponding to the first rotation axis RX1 and the second rotation axis RX2 are between 20 and 30, and the elastic coefficients corresponding to the transverse direction (the second axis AX2) and longitudinal direction (the first axis AX1) reach tens of thousands, and the second elastic member 110 can also have the same properties, so that the movable part 108 does not produce translation or displacement along the first axis AX1 and the second axis AX2 during the movement.

Based on this design, it can be ensured that the movable part 108 is stably suspended on the base 112 through the first elastic member 106 and the second elastic member 110, and it also increases the stability when the movable part 108 rotates around the first rotation axis RX1 or the second rotation axis RX2.

Figure 10:
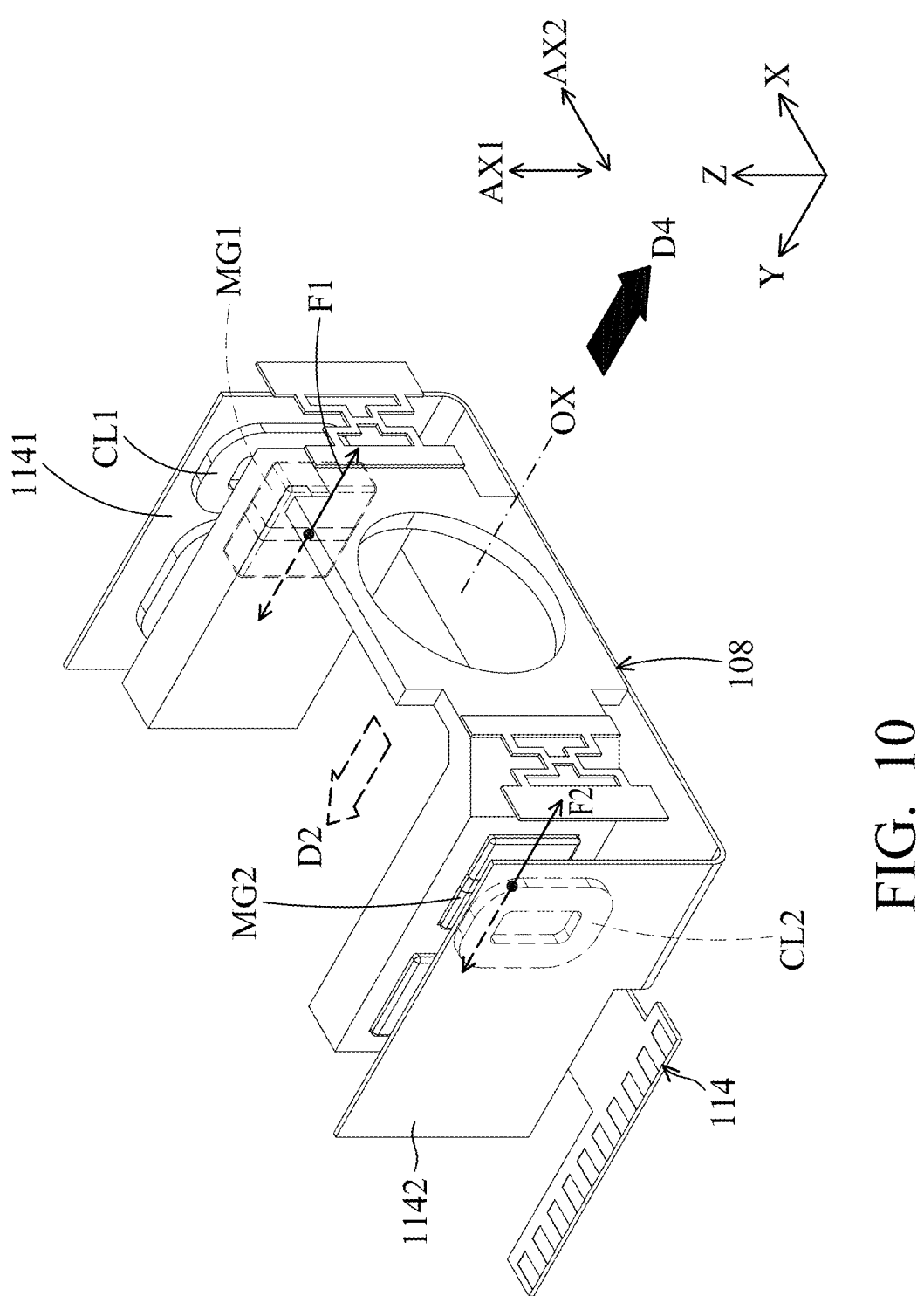
FIG. 10 is a perspective view of the movable part 108, the driving assembly DA and the circuit assembly 114 according to an embodiment of the present disclosure.

Next, please refer to FIG. 4 and FIG. 10. FIG. 10 is a perspective view of the movable part 108, the driving assembly DA and the circuit assembly 114 according to an embodiment of the present disclosure. In this embodiment, the first coil CL1 and the second coil CL2 respectively act with the first driving element MG1 and the second driving element MG2 to generate the first electromagnetic driving force F1 and the second electromagnetic driving force F2, and the directions of the first electromagnetic driving force F1 and the second electromagnetic driving force F2 are the same.

For example, when the directions of the first electromagnetic driving force F1 and the second electromagnetic driving force F2 are parallel to a fourth direction D4, the first driving element MG1 and the second driving element MG2 are configured to drive the movable part 108 to move along the optical axis OX and in the fourth direction D4. The fourth direction D4 is opposite to the second direction D2, and the fourth direction D4 and the second direction D2 are on the Y-axis.

On the other hand, when the directions of the first electromagnetic driving force F1 and the second electromagnetic driving force F2 are parallel to the second direction D2, the first driving element MG1 and the second driving element MG2 are configured to drive the movable part 108 to move along the optical axis OX and in the second direction D2.

Based on this design, in addition to the above-mentioned optical anti-shake function, the driving assembly DA can also control the movable part 108 to move forward and backward along the optical axis OX, so that the pushing portion OE23 pushes the main body OE22 to change the optical properties of the second optical element OE2, so as to achieve the purpose of autofocus.

The present disclosure provides an optical element driving mechanism 100, which can be a periscope lens mechanism, including a fixed assembly FA, a driving assembly DA, a movable part 108 and a connecting assembly CA. The movable part 108 is movably connected to the base 112 of the fixed assembly FA through the connecting assembly CA, and the movable part 108 surrounds the first optical element OE1. The optical fixed portion OE21 of the second optical element OE2 is affixed to the outer frame 102 of the fixed assembly FA, and the pushing portion OE23 is fixedly connected to the movable part 108.

The driving assembly DA is configured to drive the movable part 108 to move relative to the base 112 and the first optical element OE1 to drive the pushing portion OE23 to push the thin film OE223 and the liquid OE222, thereby changing the optical properties of the second optical element OE2, so as to achieve the purpose of optical image stabilization and macro photography. Because there is a gap between the movable part 108 and the base 112, the movable part 108 does not collide with the base 112 and cause damage when rotating.

It is worth noting that the first driving element MG1 and the third driving element MG3 of the driving assembly DA are disposed on the same side of the movable part 108, and the second driving element MG2 and the fourth driving element MG4 are disposed on the other same side of the movable part 108. Correspondingly, the first coil CL1 and the third coil CL3 are disposed on the same side of the circuit assembly 114, and the second coil CL2 and the fourth coil CL4 are disposed on the other same side of the circuit assembly 114.

Because the arrangement direction of the North-pole and South-pole of the first driving element MG1 is perpendicular to the arrangement direction of the North-pole and South-pole of the third driving element MG3 (the second driving element MG2 and the fourth driving element MG4 have the same configuration), and the longitudinal axis of the first coil CL1 is perpendicular to the longitudinal axis of the third coil CL3 (the second coil CL2 and the fourth coil CL4 have the same configuration). Therefore, such a configuration not only avoids the problem of magnetic interference, but also achieves the purpose of miniaturization at the same time.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism for accommodating a first optical element, comprising:
   a fixed assembly:

a movable part, configured to be connected to a second optical element, wherein the second optical element corresponds to the first optical element, the movable part is movable relative to the fixed assembly, and the second optical element defines an optical axis; and
   a driving assembly, configured to drive the movable part to move relative to the fixed assembly;
   wherein the fixed assembly includes a first accommodation space configured to accommodate the first optical element;
   the fixed assembly further includes a base and an outer frame;
   the outer frame is fixedly connected to the base and forms the first accommodation space;
   the fixed assembly further includes a third opening and a fourth opening;
   the outer frame has a first outer wall and a second outer wall;
   the third opening is formed on the first outer wall;
   the fourth opening is formed on the second outer wall;
   the first outer wall and the second outer wall are parallel to each other;
   when viewed along the optical axis, the third opening is larger than the second opening;
   the base includes a base plate which has a plate-shaped structure:
   the fixed assembly further includes a first supporting portion disposed on the base plate to accommodate the first optical element; and
   the first optical element is fixedly connected to the first supporting portion of the fixed assembly.

2. The optical element driving mechanism as claimed in claim 1, wherein
   the movable part includes a second accommodation space configured to accommodate the first optical element;
   the second accommodation space is located in the first accommodation space;
   the optical axis passes through the second optical element and the first optical element; and
   when viewed along the optical axis, the movable part has a long strip-shaped structure.

3. The optical element driving mechanism as claimed in claim 2, wherein
   the movable part further includes a first side wall, a second side wall and a first opening;
   when viewed along the optical axis, the first side wall is located on one side of the first optical element;
   when viewed along the optical axis, the second side wall is located on other side of the first optical element;
   when viewed along the optical axis, the first optical element is located between the first side wall and the second side wall; and
   the first opening corresponds to the first optical element.

4. The optical element driving mechanism as claimed in claim 3, wherein
   the first side wall has a first surface and a second surface, and the second side wall has a third surface and a fourth surface;
   the first surface is facing the first optical element;
   the second surface and the first surface are facing opposite directions;
   the third surface is facing the first optical element; and
   the fourth surface and the third surface are facing opposite directions.

5. The optical element driving mechanism as claimed in claim 4, wherein the first side wall and the second side wall respectively have a first groove and a second groove;

the first groove is recessed from the second surface;

the second groove is recessed from the fourth surface;

the driving assembly includes a first driving element and a second driving element, which are respectively disposed in the first groove and the second groove;

the driving assembly further includes a first coil and a second coil, corresponding to the first driving element and the second driving element respectively;

the first driving element and the second driving element are configured to drive the movable part to rotate around a first rotation axis, so that a pushing portion of the second optical element pushes a main body of the second optical element to change the optical properties of second optical element;

North-pole and South-pole of the first driving element are arranged along the optical axis; and North-pole and South-pole of the second driving element are arranged along the optical axis.

6. The optical element driving mechanism as claimed in claim 5, wherein when viewed along a first axis, at least a portion of the first optical element is exposed from the first opening;

the first axis is not parallel to the optical axis;

the movable part further includes a top wall and a second opening;

the top wall is connected between the first side wall and the second side wall;

the movable part further includes a first oblique wall which is connected between the top wall and the first side wall;

the movable part further includes a second oblique wall which is connected between the top wall and the second side wall;

the first oblique wall and the second oblique wall are not parallel to the optical axis and the first axis; and the top wall corresponds to the second optical element.

7. The optical element driving mechanism as claimed in claim 6, wherein when viewed along the first axis, the movable part has a U-shaped structure;

when viewed along the first axis, the movable part surrounds a portion of the first optical element;

the second opening corresponds to the second optical element and is located on the top wall;

the second opening is formed on the top wall;

the optical axis passes through the second opening;

the first side wall further has a third groove;

the second side wall further has a fourth groove;

the third groove is recessed from the second surface; and the fourth groove is recessed from the fourth surface.

8. The optical element driving mechanism as claimed in claim 7, wherein the driving assembly includes a third driving element and a fourth driving element, which are respectively disposed in the third groove and the fourth groove;

the driving assembly further includes a third coil and a fourth coil, corresponding to the third driving element and the fourth driving element respectively;

the third driving element and the fourth driving element are configured to drive the movable part to rotate around a second rotation axis, so that the pushing portion pushes the main body to change the optical properties of the second optical element;

North-pole and South-pole of the third driving element are arranged along the first axis;

North-pole and South-pole of the fourth driving element are arranged along the first axis;

the first driving element and the third driving element are arranged along the optical axis; and the second driving element and the fourth driving element are arranged along the optical axis.

9. The optical element driving mechanism as claimed in claim 8, wherein the third opening corresponds to the second optical element;

the third opening corresponds to the first optical element;

the fourth opening corresponds to the first optical element; and the first outer wall and the second outer wall each have a plate-shaped structure.

10. The optical element driving mechanism as claimed in claim 9, wherein the base further includes a first setting portion and a second setting portion extending from the base plate along the first axis;

when viewed along the optical axis, the first supporting portion is located between the first setting portion and the second setting portion;

when viewed along the first axis, the first side wall is located between the first setting portion and the first supporting portion;

when viewed along the first axis, the second side wall is located between the second setting portion and the first supporting portion;

there is a gap between the first surface and the first supporting portion;

there is another gap between the second surface and the first setting portion;

there is another gap between the third surface and the first supporting portion; and there is another gap between the fourth surface and the second setting portion.

11. The optical element driving mechanism as claimed in claim 10, wherein the optical element driving mechanism further includes a circuit assembly which is fixedly disposed on the base of the fixed assembly;

the circuit assembly includes a first circuit portion and a second circuit portion, respectively affixed to the first setting portion and the second setting portion;

the circuit assembly further includes a third circuit portion which is connected between the first circuit portion and the second circuit portion;

the third circuit portion is fixedly connected to a bottom of the base; and the first coil and the second coil are fixedly disposed on the first circuit portion and the second circuit portion respectively.

12. The optical element driving mechanism as claimed in claim 11, wherein the first setting portion and the second setting portion respectively form a first accommodating opening and a second accommodating opening;

the first coil and the second coil are respectively located in the first accommodating opening and the second accommodating opening;

when the first coil and the second coil respectively act with the first driving element and the second driving element to generate a first electromagnetic driving force and a second electromagnetic driving force, the first driving element and the second driving element are configured to drive the movable part to rotate around the first rotation axis;

the first rotation axis is parallel to the first axis; and the first electromagnetic driving force and the second electromagnetic driving force are exerted in opposite directions.

13. The optical element driving mechanism as claimed in claim 12, wherein the third coil and the fourth coil are respectively and fixedly disposed on the first circuit portion and the second circuit portion;

the third coil and the fourth coil are respectively located in the first accommodating opening and the second accommodating opening;

the third driving element and the fourth driving element are configured to drive the movable part to rotate around the second rotation axis when the third coil and the fourth coil respectively act with the third driving element and the fourth driving element to generate a third electromagnetic driving force and a fourth electromagnetic driving force; and the third electromagnetic driving force and the fourth electromagnetic driving force are exerted in the same direction.

14. The optical element driving mechanism as claimed in claim 13, wherein the optical element driving mechanism further includes a connecting assembly, so that the movable part is movably connected to the fixed assembly through the connecting assembly;

the connecting assembly includes a first elastic member and a second elastic member;

the first elastic member and the second elastic member respectively have a first flexible portion and a second flexible portion;

the first flexible portion has flexibility;

the second flexible portion has flexibility;

when viewed along the optical axis, the first flexible portion and the first optical element are arranged along a second axis;

the second axis is not parallel to the first axis; and the second rotation axis is parallel to the second axis.

15. The optical element driving mechanism as claimed in claim 14, wherein when viewed along the optical axis, a longitudinal axis of the movable part having a long strip-shaped structure is parallel to the second axis;

when viewed along the optical axis, the first flexible portion and the second flexible portion are arranged along the second axis;

when viewed along the optical axis, a center of the second optical element is located between the first flexible portion and the second flexible portion;

when viewed along the optical axis, the first rotation axis is located between the first flexible portion and the second flexible portion; and when viewed along the optical axis, the second rotation axis passes through the first flexible portion and the second flexible portion.

16. The optical element driving mechanism as claimed in claim 15, wherein the first elastic member has a first connecting end which is fixedly connected to the fixed assembly;

the first connecting end is affixed to a first setting portion;

the first elastic member further has a second connecting end which is fixedly connected to the movable part;

the first flexible portion is connected between the first connecting end and the second connecting end;

the second elastic member has a third connecting end which is fixedly connected to the fixed assembly;

the third connecting end is affixed to a second setting portion;

the second elastic member further has a fourth connecting end which is fixedly connected to the movable part;

the second flexible portion is connected between the third connecting end and the fourth connecting end;

when viewed along the optical axis, the first setting portion, the second optical element and the second setting portion are arranged along the second axis; and when viewed along the optical axis, the optical element driving mechanism does not include any flexible portion arranged with the second optical element along the first axis.

17. The optical element driving mechanism as claimed in claim 16, wherein the first optical element and the second optical element have different materials;

the first optical element and the second optical element have different material states;

the second optical element is a liquid lens;

the first optical element includes a solid lens;

the second optical element includes an optical fixed portion;

the optical fixed portion is fixedly connected to the fixed assembly;

the optical fixed portion is affixed to the fixed assembly by laser welding;

the optical axis passes through the main body;

the pushing portion is fixedly connected to the movable part;

the pushing portion has a ring-shaped structure; and when viewed along the optical axis, the optical fixed portion overlaps at least a portion of the connecting assembly.

18. The optical element driving mechanism as claimed in claim 10, wherein the optical element driving mechanism further includes a circuit assembly which is fixedly disposed on the base of the fixed assembly;

the circuit assembly includes a first circuit portion and a second circuit portion, respectively affixed to the first setting portion and the second setting portion; and the first coil and the second coil are fixedly disposed on the first circuit portion and the second circuit portion respectively.

19. The optical element driving mechanism as claimed in claim 18, wherein the first setting portion and the second setting portion respectively form a first accommodating opening and a second accommodating opening;

the first coil and the second coil are respectively located in the first accommodating opening and the second accommodating opening;

when the first coil and the second coil respectively act with the first driving element and the second driving element to generate a first electromagnetic driving force and a second electromagnetic driving force, the first driving element and the second driving element are configured to drive the movable part to move along the optical axis; and the first electromagnetic driving force and the second electromagnetic driving force are exerted in the same directions.

* * * * *